Feb. 23, 1926.

G. WILCOX 1,574,224

CAN ARRANGING MACHINE

Filed March 28, 1923    6 Sheets-Sheet 1

INVENTOR:
GEORGE WILCOX,
BY
ATTORNEYS.

Feb. 23, 1926.                                                    1,574,224
G. WILCOX
CAN ARRANGING MACHINE
Filed March 28, 1923          6 Sheets-Sheet 3

INVENTOR:
GEORGE WILCOX,
BY
ATTORNEYS.

Feb. 23, 1926.

G. WILCOX 1,574,224

CAN ARRANGING MACHINE

Filed March 28, 1923

INVENTOR:
GEORGE WILCOX,
BY
Graham + Davis
ATTORNEYS.

Feb. 23, 1926.

G. WILCOX 1,574,224

CAN ARRANGING MACHINE

Filed March 28, 1923    6 Sheets-Sheet 5

INVENTOR:
GEORGE WILCOX,
BY
Graham + Muir
ATTORNEYS.

Feb. 23, 1926.
G. WILCOX
CAN ARRANGING MACHINE
Filed March 28, 1923     6 Sheets-Sheet 6

1,574,224

INVENTOR:
GEORGE WILCOX,
BY
Graham + Davis
ATTORNEYS.

Patented Feb. 23, 1926.

1,574,224

UNITED STATES PATENT OFFICE.

GEORGE WILCOX, OF RIVERSIDE, CALIFORNIA, ASSIGNOR TO CALIFORNIA CANNING MACHINERY CO., A CORPORATION OF CALIFORNIA.

CAN-ARRANGING MACHINE.

Application filed March 28, 1923. Serial No. 628,249.

*To all whom it may concern:*

Be it known that I, GEORGE WILCOX, a citizen of the United States, residing at Riverside, in the county of Riverside and State of California, have invented a new and useful Can-Arranging Machine, of which the following is a specification.

This invention relates to a device which takes cans, packages, or other objects from a machine or operation and arranges them in regular order in trays or boxes.

The invention has its particular utility in the canning industries and is of considerable value in the canning of food stuffs, such as fruits and vegetables. In the fruit canning industries mechanical devices are employed for carrying the filled cans through various operations, which devices operate with considerable rapidity, therefore making it necessary to employ several persons for the purpose of arranging the cans as they are discharged from the machine. The automatic cookers now employed in fruit canning discharge the cans, in which the contents have been cooked, at a high rate of speed and in highly heated condition. These cans being discharged from the machine at a high rate of speed require the services of several men to place them in the trays, and owing to the fact that the trayers must work in practically the same area, a great deal of interference results.

It is an object of my invention to provide a device which will receive cans from a machine, these cans being in heated condition or otherwise, and will place the cans in regular arrangement in the trays provided therefor.

It is a further object of the invention to provide a device of this character which operates solely from the movement and weight of the cans fed thereinto, and does not require the utilization of other mechanical energy.

It is a further object of the invention to provide in such a device a means for moving the trays or can receivers synchronously with the movement of the can depositing member in such a manner that the cans are disposed accurately within the receiver.

It is a further object of this invention to provide in this device a novel form of traying guide which directs the cans into their proper positions within the trays without liability of tearing or marring such wrappers or labels as may be placed thereupon.

A further object of the invention is to provide a device which is held inoperative in the absence of a tray to receive the cans from the depositing member, thereby making it impossible to discharge the cans except when a tray is properly placed to receive them.

It is a further object of the invention to provide a can arranging device of this character which will dispose the cans or other similar object in a tray or box in superimposed tier arrangement.

The invention consists essentially of a delivery member which receives the cans from a previous operation and delivers these cans to a depositing member which is arranged to receive at each operation thereof a sufficient number of cans to form a complete row in the receiver which may consist of either a tray or a box. The receiver is disposed upon a roller conveyor and an advancing mechanism is provided which moves the receiver intermittently into the proper position to receive the cans from the can depositing member. The can depositing member is arranged upon a pivot in such a manner that a preponderance of weight at one side thereof is caused by the cans delivered thereinto from the delivery member, this weight being sufficient to cause the actuation of the depositing member and the operation of the advancing mechanism. By this improved arrangement, the machine is operated entirely due to the potential energy derived from the position of the cans in the depositing member at a slight distance above the receiver in which they are delivered.

The particular advantages of the invention and further objects thereof will be made evident hereinafter.

Referring to the drawing which is for illustrative purposes only,

Figure 1:
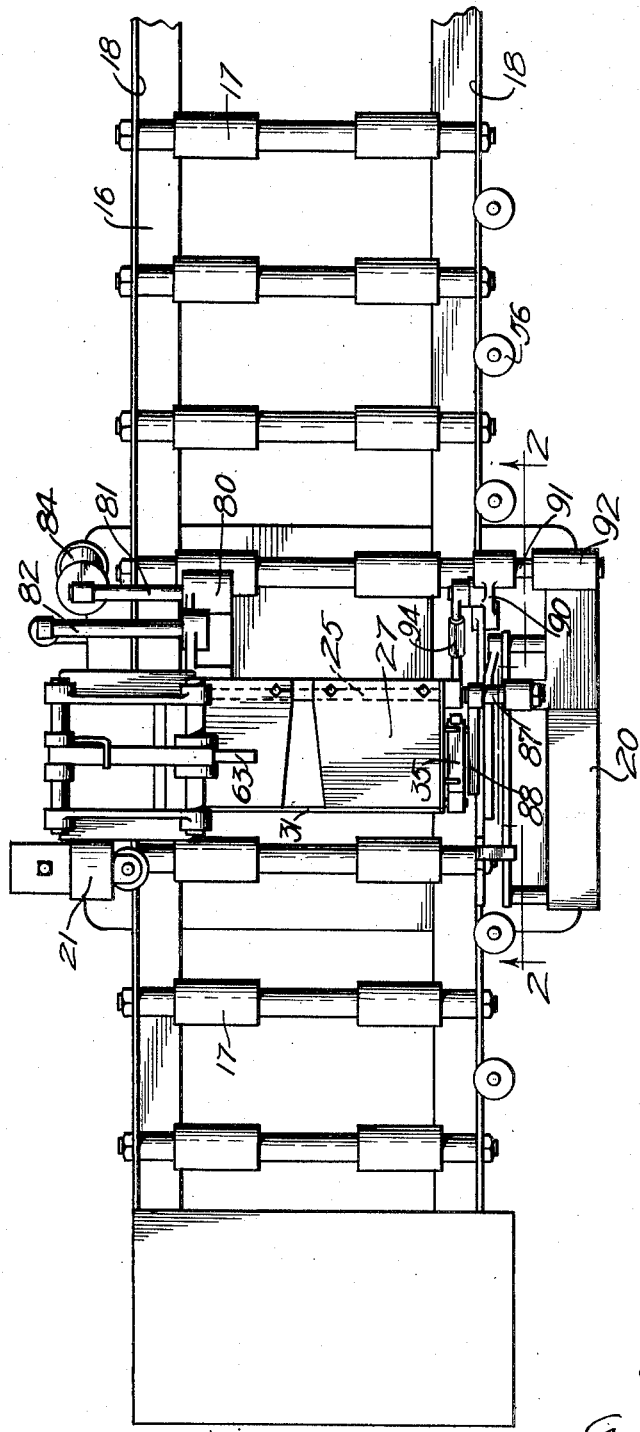
Fig. 1 is a plan view of a can arranging machine embodying the features of my invention.

The device as shown in the drawing provides a table or supporting structure 15 which has mounted thereupon a conveyor 16 comprised of rollers 17 mounted between horizontal side members 18 which may be conveniently made from standard angular sections. At the forward end of the table 15, as shown in Figs. 1 and 4, an upright supporting casting 20 is placed, and at the rear of the table a rear casting 21 is situated which supports at the upper end thereof the discharge end 22 of the delivery member of the device which consists essentially of a chute 23 and the discharge end 22 into which the cans, as indicated by the dotted lines 24 in Fig. 4, roll from the machine in which the cans have undergone a previous step in the canning operation.

Between the upright frames 20 and 21 a horizontal shaft 25 is mounted which extends longitudinally along the lower right hand corner of the can depositing member 27 which pivots thereupon. This can depositing member 27 consists of a boxlike member having an open end 28 adjacent to the mouth of the discharge end of the delivery member as shown in Fig. 4, and having the left side thereof open as indicated at 29. Between a pair of lugs 30 placed at the lower left hand corners of the depositing member 27 a guard strip 31 is pivoted upon a shaft 32. This guard strip extends slightly above the lower edge of the opening 29 in the left hand side of the depositing member, as shown at 33, and is supplied for the purpose of preventing the dropping of the cans from the depositing member during the time that it swings from the raised position shown in Fig. 2, to the lowered or depositing position shown in Fig. 3. The shaft 32 upon which the guard strip 31 is mounted projects forwardly from the depositing member 27 and has mounted thereupon a lever 35 which is engaged by a vertical latch member 36 having a horizontally extending arm 37 as shown in Fig. 2.

During the greater portion of the downward swing of the depositing member 27, the latch 36 remains engaged with the lever 35 and therefore holds the guard strip 31 securely in obstructing position. Upon reaching the lower extremity of its swing, the horizontal arm 37 of the latch member 36 is engaged by a stationary pin 38, which extends inwardly from the forward upright structure 20 as shown in Fig. 4, into a position where it will engage the lower end of the arm 37 as shown in Fig. 3 and will thus cause the relative movement of the latch member 36 into a position of disengagement with the arm 35 whereupon the arm is allowed to swing over against a pin 40, as shown in Fig. 3, with the subsequent swinging of the guard strip 31 out of obstructing position to allow the cans contained in the depositing member 27 to drop into a can receiver 41 which may consist of either a tray or box.

Figure 2:
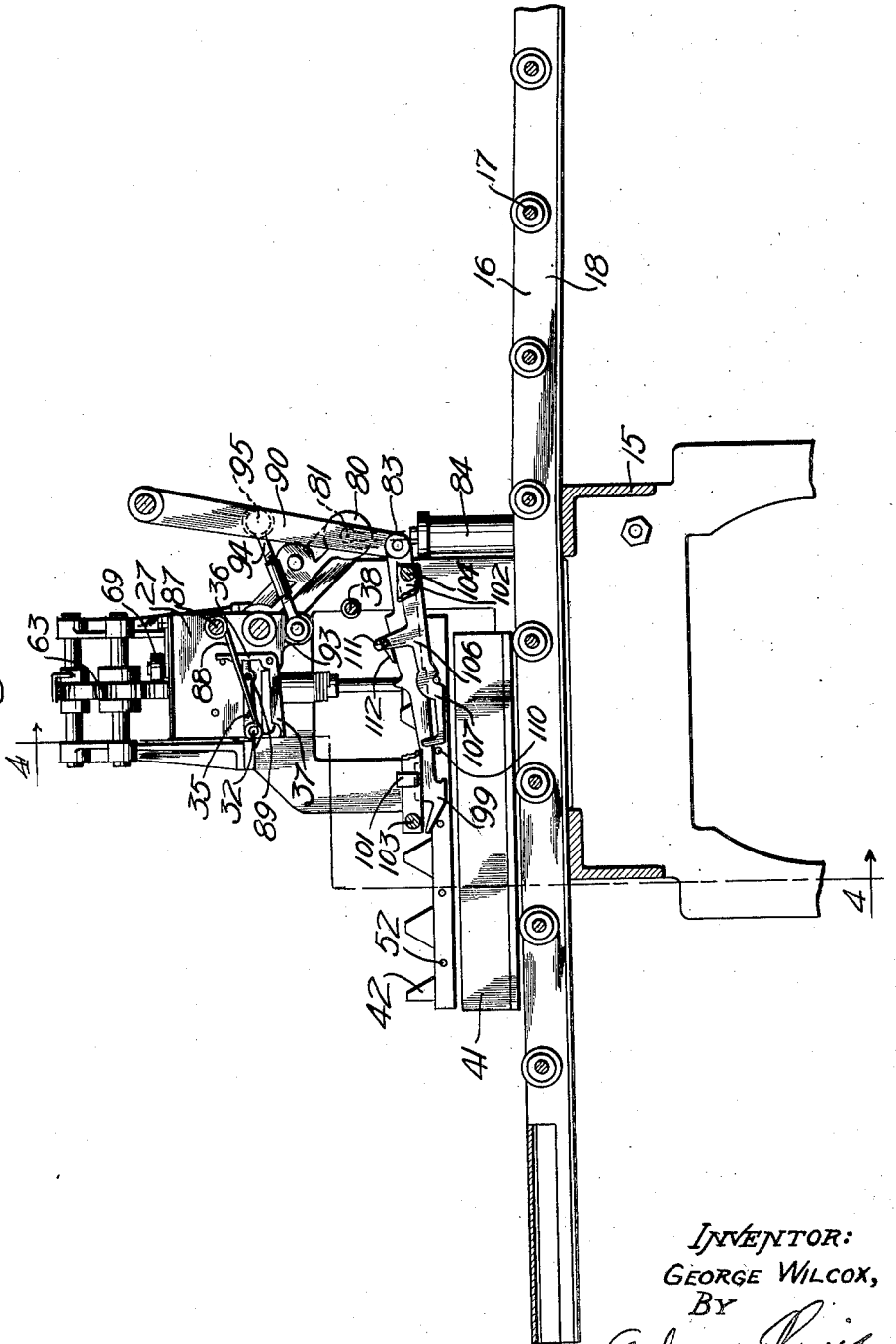
Fig. 2 is an elevational view of the device shown in Fig. 1, partially sectioned as indicated by the line 2—2 of Fig. 1.
Figure 3:
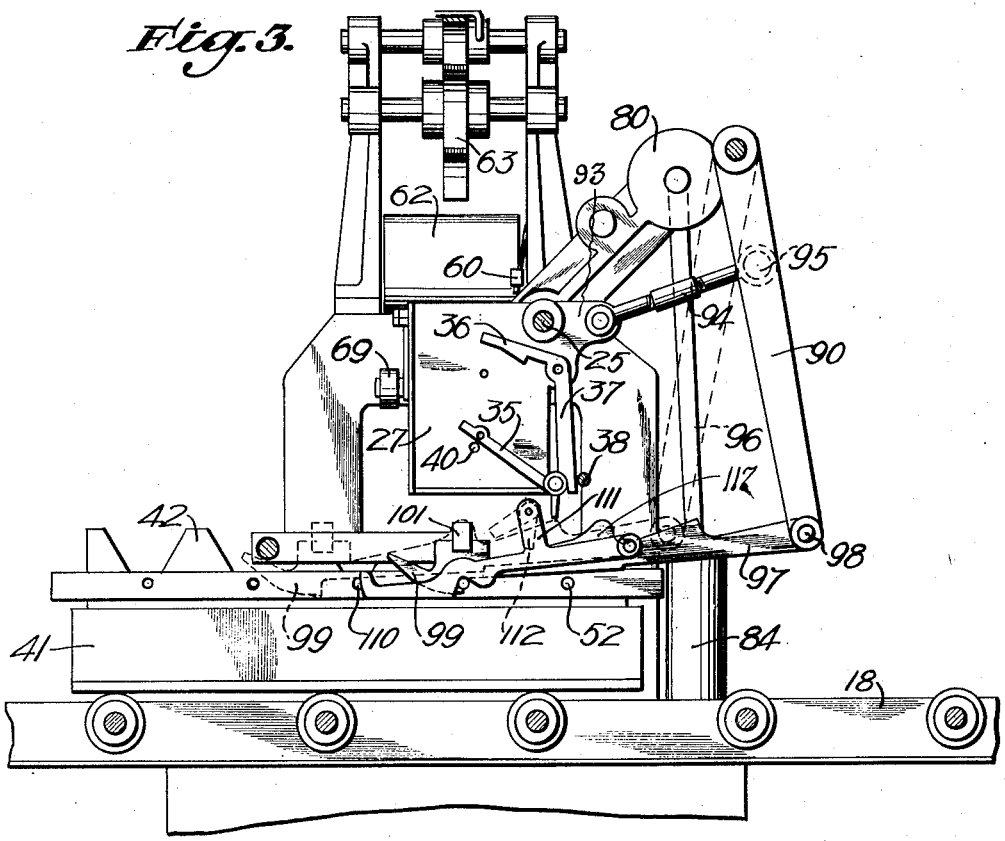
Fig. 3 is an enlarged fragmentary elevation similar to Fig. 2, but showing the depositing member in lowered position and likewise showing the advancing mechanism in advanced position.
Figure 4:
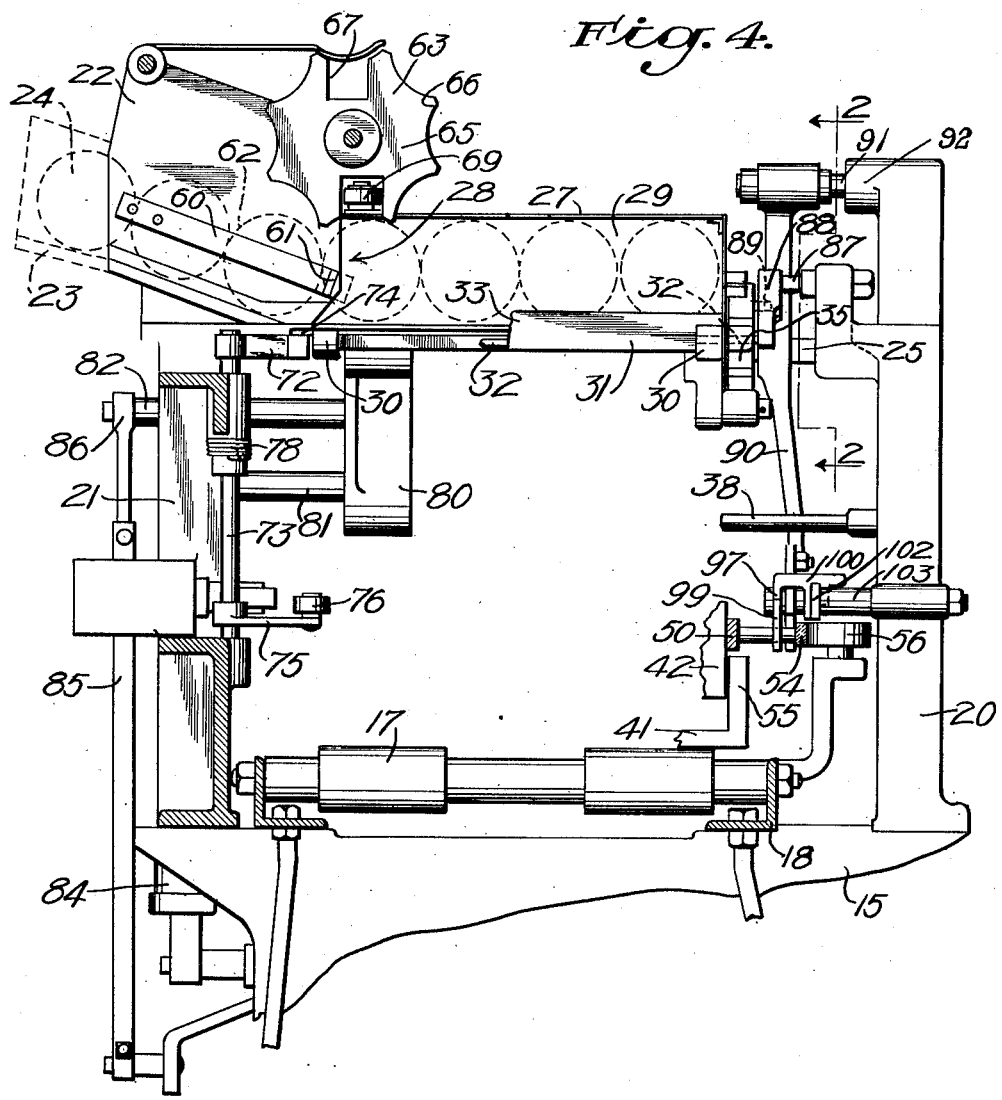
Fig. 4 is a slightly enlarged section taken upon a plane represented by the line 4—4 of Fig. 2.
Figure 7:
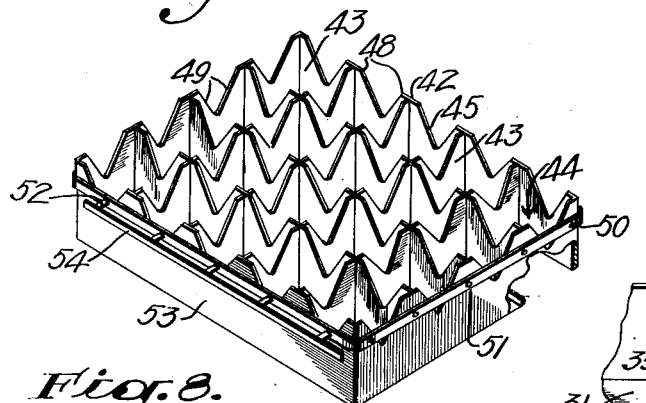
Fig. 7 is a perspective view of the traying guide employed for directing the cans into their respective positions in the tray.

In Figs. 2, 3 and 4, the receiver 41 is illustrated in the form of a tray in which a single layer of cans is deposited. In each of the trays 41 I employ a can guide 42 of the type illustrated in Fig. 7. This guide 42 is comprised of sheet metal walls 43 disposed to form consecutive vertical channels or spaces 44 into which the cans drop from the depositing member 27. These channels 44 are open at both top and bottom and the upper edges of the plates 43 have V-shaped notches 45 cut therein which serve to direct the cans centrally into the channels 44 whenever such cans may drop from the can depositing member 27 in positions not directly in alignment with the channels.

Figure 8:
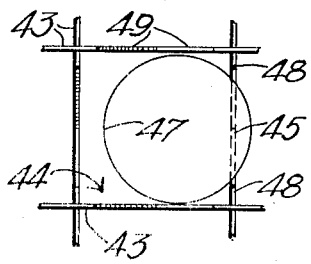
Fig. 8 is an enlarged diagrammatic illustration showing the manner in which the traying guide functions.

In Fig. 8 of the drawing, the action of the notches 45 in centralizing the can is illustrated. Let it be supposed that a can is dropped over a channel in the position indicated by the circle 47. Although this disalignment is considerably greater than would ordinarily occur in the operation of the machine, it will be seen that the circle will lie within the upper extremities 48 of the notch 45, and will therefore as the can moves downwardly be forced inwardly by the converging edges 49, which define the notch 45, into a centralized position with respect to the channel 44. The guide member is provided with a reinforcing strip 50 extending entirely therearound which is riveted in place as indicated at 51 and has equally spaced pins 52 projecting outwardly from the front side 53, which pins 52 are surmounted by a guide strip 54. The guide member 42 may be of sufficient depth to extend entirely to the bottom of the tray 41, but as shown in Fig. 4 may extend only a short distance down thereinto and be supported by the reinforcing strip 50 engaging the side walls 55 of the tray 41. Rollers 56 are provided upon each side of the conveyor. As shown in Fig. 4, these rollers bear against the reinforcing member 50 and the guide strip 54 in such a manner that the tray is held in a central position throughout its travel along the conveyor 16.

As will be evident from an inspection of Fig. 4 the chute 23 and the discharge end 22 of the delivery member is placed on a slight incline so that there will be a natural tendency for the cans 24 to roll into the depositing member 27. This the cans may freely do when the depositing member 27 is in raised position, but are prevented from leaving the discharge end 22 by a spring latch 60 having a hook formation 61 at the forward end thereof against which the end can 62 engages, when the depositing member is released by the releasing mechanism 63 and swings downwardly from the raised position into the lowered position indicated in Fig. 3, in which figure in a can 62 is shown engaged and held by the spring latch 60.

The releasing mechanism 63 consists of a star wheel 65 having points 66 and being provided with notches 67 between every fourth and fifth consecutive point 66. It will be perceived that as the cans 24 roll into the depositing member, the star wheel is advanced one point. In the type of can arranging machine shown in Figs. 1 to 4, the depositing member 27 is designed to receive four cans 24. Therefore after the receiving of the full number of cans by the depositing member one of the notches 67 will be brought into a position before a roller 69, mounted upon the top of the depositing member and bearing against the face of the star wheel 65 between the notches 67. Upon the bringing of a notch 67 into alignment with the rollers 69, the depositing member may swing downwardly providing a receiver or tray 41 is in position therebeneath. In order that the cans will not be deposited when a tray is not in place, a catch member 72 is mounted upon a vertical shaft 73 in such a position that it engages a projection 74 at the inner end of the depositing member 27. At the lower end of the shaft 73 an arm 75 is mounted which has a roller 76 at the inner end thereof, which roller 76 is engaged by a tray placed in operative position upon the conveyor with the result that the lever 75 is swung over and the shaft 73 rotated against the action of a torsion spring 78, and brings the catch 72 out of engaging position with the projection 74. Therefore, when a tray is in place, the safety catch 72 is disengaged and upon the alignment of a notch 67 with the roller 69, the depositing member 27 will swing downwardly due to the weight of the cans, whereupon the cans contained therein will be deposited in the manner hereinbefore described.

A counterweight 80 extends rearwardly from the depositing member and has rearwardly extending therefrom arms 81 and 82. The arm 81 as shown in Fig. 2 has a plunger shaft 83 connected thereto which extends downwardly into an air cushion check cylinder 84 which limits the rapidity and force of the downward movement of the depositing member 27. The counterweight 80 and a spring retracted rod 85 which pivots at 86 upon the pin 82 provide force for returning the depositing member 27 to the raised position after the cans have been released and placed in the tray 41. Upon an inwardly extending pin 87 shown in Figs. 2 and 4 is mounted a stationary engagement member 88 which is disposed in a position to engage an outwardly projecting pin 89 mounted upon the lever 35. As the depositing member 27 is swung from the position shown in Fig. 3 back to the raised position in which it is shown in Fig. 2, the pin 89 comes against the member 88 and the lever 35 is forced back into engagement with the latch 36, thus placing the guard strip again in operative position.

The advancing mechanism by which the tray 41 is moved into the consecutive positions for receiving the rows of cans from the depositing member consists of a swingable arm 90 which is pivoted upon a pin 91 extending inwardly from the upper end 92 of the forward upright structure 20. This arm is linked to a downwardly extending projection 93 on the depositing member 27 by means of an adjustable length link 94 which is pivoted near the center of the arm 90 as indicated at 95. When the depositing member 27 is in raised position as indicated in Fig. 2, the arm is held slightly inclined to the left as indicated in this figure and also as indicated in the dotted lines 96 in Fig. 3. Upon the release of the depositing member 27, the arm 90 is swung over to the right, as shown in Fig. 3. An advancing pawl 97 is pivoted at 98 to the lower end of the arm 90 and is provided at the forward end thereof with a hook 99 which is adapted to engage the pins 52 in such a manner that the tray 41 is pulled forwardly at each downward swing of the depositing member.

It will be noticed that the pins 52 are disposed centrally of the channels 44 in the can guide 42 and it will be seen that the movement of the advancing pawl is somewhat greater than the spacing of the pins 52. As shown best in Fig. 4, the pawl 97 is provided with an outwardly extending arm 100 having the end thereof downwardly forked as indicated at 101, so as to fit over a horizontal guide bar 102 mounted upon pins 103 and 104 which extend inwardly from the forward upright structure 20. Pivoted also upon the pin 104 is a lock lever 106 which has the forward end thereof formed as indicated at 107 to fit between adjacent pairs of pins 52, thus serving to hold the tray 41 stationary during the rearward movement of the pawl into position to engage a consecutive pin 52.

It will be noticed from Figs. 2 and 3 that when the pawl 97 is disposed in the extreme leftward position accompanying the raised position of depositing member 27, that the hooked end 99 thereof extends considerably beyond the pin 52 indicated at 110. Upon the forward or advancing movement of the pawl which accompanies the downward swing of the depositing member 27, the hooked end 99 comes in contact with the pin indicated at 110 and moves it forwardly, or in other words in a right hand direction, so that when the depositing member 27 has reached the lower end of its downward swing another row of channels 44 will be in position to receive the cans as they are dumped from the depositing member.

Figure 5:
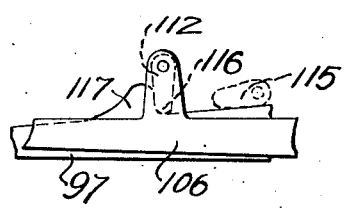
Fig. 5 is a fragmentary diagrammatic view showing the manner in which the lifting cam raises the locking lever when the advancing pawl moves the tray in which the cans are deposited into their consecutive positions.
Figure 6:
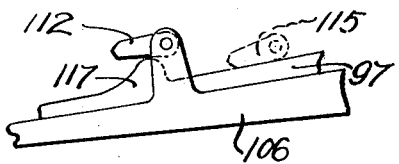
Fig. 6 is a diagrammatic view illustrating one of the relative positions between the advancing pawl and the locking lever.

The latch or stop lever 106, however, must be disengaged during the forward movement of the tray 41. This is accomplished by the following construction. Upon an upwardly extending projection 111 of the latch member a cam 112 is pivoted. This cam 112 swings freely upon its pivot and therefore rides upon the upper edge of the pawl 97. When the pawl is in the position indicated in Fig. 2, the cam 112 lies upon the upper edge thereof in a leftwardly extending position, as shown, and as further shown at 115 in Fig. 5. During the initial rightward movement of the pawl previous to the engagement of the hook end 99 with the pin indicated at 110, the point 116 of the cam 112 comes against an upwardly projecting protuberance 117 formed upon the upper edge of the pawl, causing the cam to rotate downwardly with the result of a relative upward movement of the latch member 106. This upward movement of the latch member is completed simultaneously with the engagement of the hooked end 99 of the pawl with the pin indicated at 110 so that when the pin 110 is being pulled forwardly, the latch member 106 is in raised position. When the latch member is again free to descend due to the passage of the protuberance 117 underneath the cam 112, the pin 110 is in a position intermediate between the ends of the portion 107 so that the latch member rests upon the pin 110 until the end of the advancing stroke is reached. When the end of the advancing stroke of the pawl 97 is reached, as shown in Fig. 3, the cam 112 swings into a substantially vertical position so that as the pawl again moves leftwardly the lower end of the cam 112 is swung to the left by the engagement of the upper edge of the pawl and rides over the protuberance 117 as indicated in Fig. 6 and again drops into the position indicated at 115 to the right end of the protuberance 117.

From the foregoing, it is evident that the tray 41 advances forwardly during the downward movement of the depositing member and that this forward movement is accomplished solely by the weight of the cans. The tray remains stationary during the upward or return movement of the depositing member 27 and remains so until the depositing member has received its quota of cans and is released so as to swing downwardly. It will be noticed that in the arrangement of the link 94 which extends between the depositing member 27 and the arm 90, the smallest leverage exerted through the projection 93 is during the first part of the downward swing of the member 27 and that as the member 27 approaches the lower portion of its swing so that the effective leverage of the weight of the cans is decreased, the force exerted by the projection 93 is considerably increased due to the direction in which the thrust is received by the link 94. In this manner a substantially constant force is exerted for the advance of the tray 41.

The device herein shown receives the cans laterally from the delivery member or chute in horizontal or rolling position and deposits them in upright position in the tray, and in the illustrated form of my invention it is the weight of the cans, or the work exerted by the cans in swinging from horizontal position to upright position that operates the oscillatory depositing device.

Figure 10:
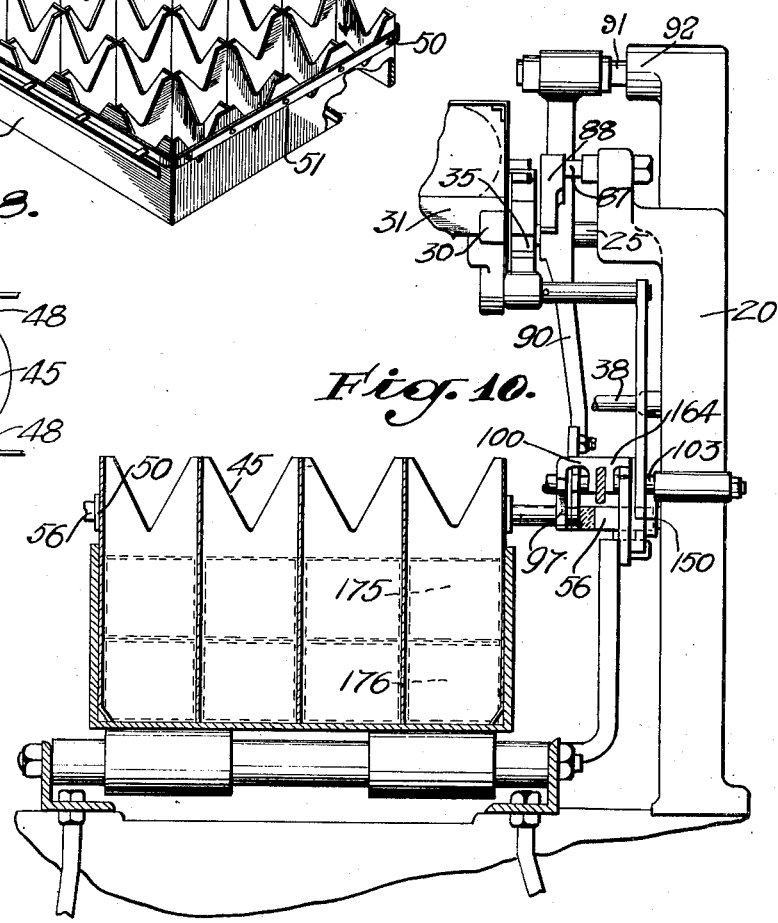
Fig. 10 is a fragmentary sectional view taken on a plane represented by the line 10—10 of Fig. 9.
Figure 9:
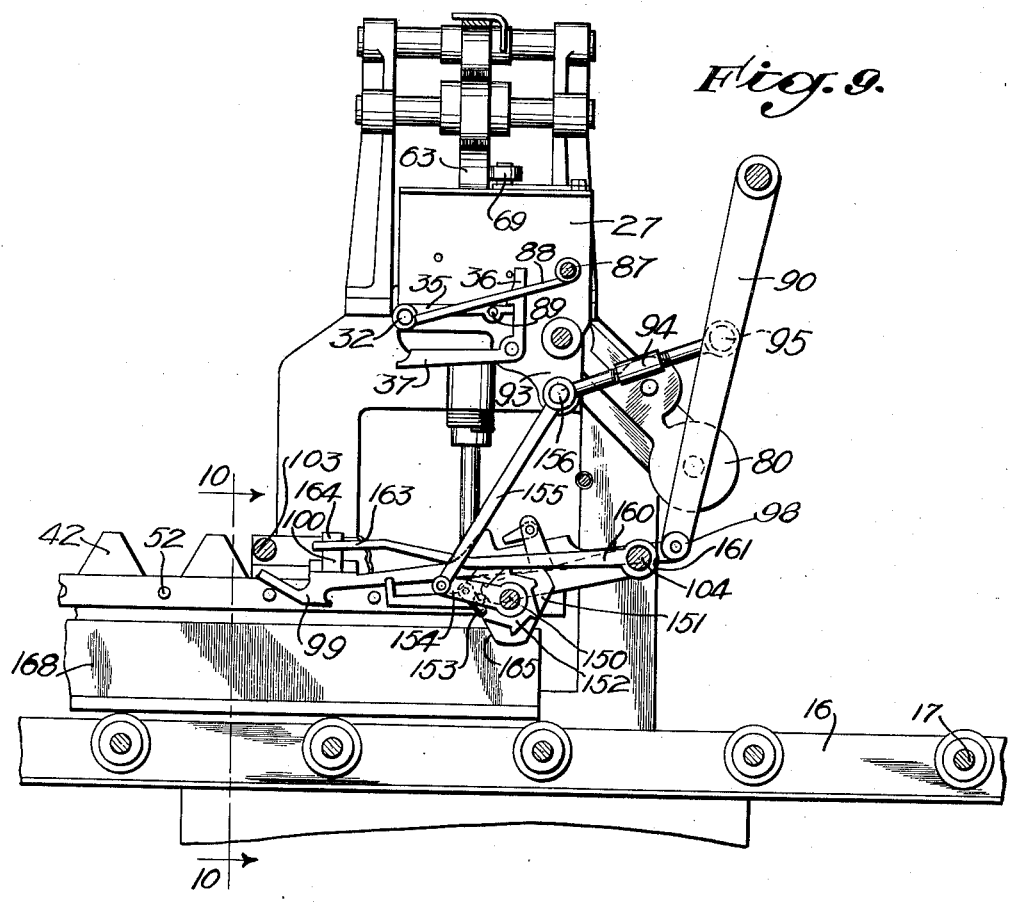
Fig. 9 is an elevational view similar to Fig. 2 showing the device equipped for arranging the cans in tiers such as is necessary in the packing of shipping boxes.
Figure 11:
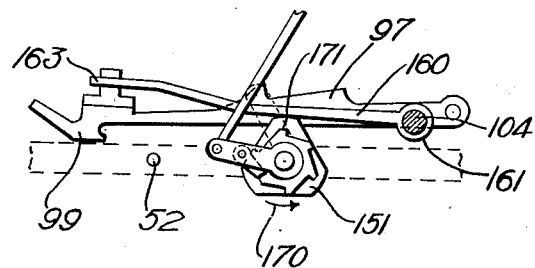
Fig. 11 is a fragmentary diagrammatic detail illustrating the operation of the lifting cam which causes the intermittent advance of the can receiver so that the rows of cans will be placed therein in tiers.

In the previous views of the drawings the machine is shown equipped for placing the cans in a single layer tray, but in Figs. 9, 10 and 11, however, I show the invention equipped for placing the cans in tiers as is necessary in boxing the cans for shipment. At a point intermediate between and slightly below the level of the pins 104 which support the horizontal guide bar 102, a pin 150 is extended inwardly from the front upright supporting casting 20. This pin, as shown best in Fig. 9, has mounted thereupon a triangular cam 151 which is provided with a six toothed ratchet 152 on the forward side thereof. This ratchet is engaged by a pawl 153 mounted on an arm 154 which swings also upon the pin 150 and is reciprocated through a link 155 from the pin 156 mounted upon the projection 93 of the depositing member. Each time the depositing member swings from one position to the other, the arm 154 is relatively moved; with the result that each time the depositing member returns to raised position, the cam 151 is rotated therethrough one-sixth of a complete rotation. A lifting lever 160 is pivoted at 161 to the pin 104 and extends leftwardly over the cam 151 upon which it rests. The forward end 163 of the arm 160 extends under a projection 164 formed upon the member 100 which is a part of the advancing pawl 97.

When the cam is disposed as shown in Fig. 9 in a position in which one of the faces 165 which is at minimum radial distance from the center of rotation of the cam is disposed upwardly, the lever 160, resting thereupon, is disposed in a lowered position which allows engagement of the hook end 99 of the advancing pawl 97 to engage a pin 52. This allows the tray or box 168 to be advanced with the movement of the depositing member. Upon depositing the cans, the depositing member returns to raised position and the swing of the projection 93 thereupon is transferred to the arm 154 causing a one-sixth rotation of the cam in the direction indicated by the arrow 170 in Fig. 11, or in other words the cam is rotated so that a point 171 thereof is disposed upwardly, which raises the arm 160 and through the forward end 163 thereof lifts the hook end 99 of the advancing pawl 97 into the position shown in Fig. 11. In this position the hook end 99 is held above the plane of the pins 52 so that as the advancing pawl 97 is moved forwardly in accompaniment with the downward swing of the depositing member 27 the hook end 99 will pass above the pin 52 which it would ordinarily engage, with the result that there is no movement of the tray during the deposit of the cans contained in the member 27 with the result that these cans are deposited in a second tier 175 indicated in Fig. 10, above the tier 176 placed by the previous operation of the depositing device.

Although a cam is herein shown for depositing the rows in two tiers, it will be readily understood that by merely changing the design of the cam and the ratchet employed therewith, the number of tiers in which the cans are placed may be changed in number as desired. This simple can arrangement shown in the drawing provides a movement of the tray at every second succeeding operation of the depositing member and therefore gives the desired result of placing the cans in tiers in a tray or box.

A device of the character shown will operate at a very high rate of speed and therefore will replace the labor of four manual workmen owing to the fact that where the cans are received for traying from a cooker, the work of traying them is so strenuous that two squads consisting of two men each is ordinarily employed, so that one squad may relieve the other at frequent intervals. The device, as hereinbefore stated, may be employed for traying cans received from the cookers and other machines and may also be employed for the purpose of packing the cans in boxes or cartons for shipment, this all being done at a higher rate of speed and more economically than can be at present done manually. The employment of the spring latch 60 in the delivery member 22 prevents movement of the cans from the mouth of the delivery member unless the depositing member is in place to receive them. The employment of a spring catch 72, and its accompanying mechanism which includes the roller 76 disposed in a position engageable by the tray guide, prevents the operation of the depositing member when there is no tray in place to receive the cans. By this arrangement, the dumping of the cans inadvertently down through the machine is positively prevented.

I claim as my invention:

1. In a device of the class described, the combination of: a delivery member which receives objects from a previous operation; a receiver into which said objects are to be deposited in consecutive rows; a depositing member into which said objects are delivered by said delivery member, said depositing member receiving at each operation thereof a number of cans comprising a row in said receiver; and means operative from said depositing member for advancing said receiver as the rows of said objects are deposited therein by said depositing member.

2. In a device of the class described, the combination of: a delivery member which carries objects from a previous operation; a receiver into which said objects are to be deposited; a depositing member into which said objects are delivered by said delivery member; releasing mechanism for permitting the operation of said depositing member when the designated number of said objects have been delivered thereinto by said delivery member; and means for preventing the operation of said depositing member when said receiver is not in place to receive said objects therefrom.

3. In a device of the class described, the combination of: a delivery member which receives objects from a previous operation; a depositing member situated before the mouth of said delivery member and eccentrically hinged in such a manner that the weight of said objects delivered thereinto will cause said depositing member to swing downwardly into a position substantially perpendicular to said position before said mouth of said delivery member an obstructing member for retaining said objects in said depositing member; latch means retaining said obstructing member in operative position; means for releasing said latch member when said depositing member has reached said position substantially perpendicular to said position thereof before the mouth of said delivery member; and a receiver into which said objects are deposited upon release from said depositing member.

4. In a device of the class described, the combination of: a delivery member which receives objects from a previous operation; a depositing member situated before the mouth of said delivery member and eccentrically hinged in such a manner that the weight of said objects delivered thereinto will cause said depositing member to swing downwardly into a position substantially perpendicular to said position before said mouth of said delivery member; an obstructing member for retaining said objects in said depositing member; latch means retaining said obstructing member in operative position; means for releasing said latch member when said depositing member has reached said position substantially perpendicular to said position thereof before the mouth of said delivery member; a receiver into which said objects are deposited upon release from said depositing member; an arm pivoted at one end and having an advancing pawl at the other end thereof; and a link extending between said arm and said depositing member whereby said pawl is caused to advance said receiver contiguous with the operation of said depositing member.

5. In a device of the class described, the combination of: a delivery member which receives objects from a previous operation; a depositing member situated before the mouth of said delivery member and eccentrically hinged in such a manner that the weight of said objects delivered thereinto will cause said depositing member to swing downwardly into a position substantially perpendicular to said position before said mouth of said delivery member; an obstructing member for retaining said objects in said depositing member; latch means retaining said obstructing member in operative position; means for releasing said latch member when said depositing member has reached said position substantially perpendicular to said position thereof before the mouth of said delivery member; a receiver into which said objects are deposited upon release from said depositing member; an arm pivoted at one end and having an advancing pawl at the other end thereof; a link extending between said arm and said depositing member whereby said pawl is caused to advance said receiver contiguous with the operation of said depositing member; and means for restricting the action of said pawl in such a manner that said receiver will be intermittently advanced.

6. In a traying guide of the class described, comprising: a member which may be placed in a receiver in which objects are to be arranged, said member providing perpendicularly placed walls enclosing openings through which said objects may pass, said walls having guide notches formed in the upper edges thereof for centralizing said objects as they enter said openings.

7. In a traying guide of the class described, comprising: a member which may be placed in a receiver in which objects are to be arranged, said member providing perpendicularly placed walls enclosing openings through which said objects may pass, said walls having substantially V-shaped guide notches formed in the upper edges thereof for centralizing said objects as they enter said openings.

8. In combination, in a device of the class described: a receiving member; a depositing member; an advancing member arranged to engage the receiving member and advance same at each operation of the depositing member of said device; and means for operatively connecting said advancing member with said depositing member.

9. In an arrangement as defined in claim 8, in combination: means for locking said receiver during the return stroke of said advancing member.

10. In an arrangement as described in claim 8, in combination: means for locking said receiver during the return stroke of said advancing means; and means for disengaging said locking means during the advancing stroke of said advancing member.

11. In combination, in a device of the class described, comprising a frame and a depositing member, a releasing mechanism comprising: a releasing member; and a releasing member engager, one of said members being associated with the frame of said device and the other of said members being associated with the depositing member of said device, said releasing member being arranged to disengage said engager when said depositing member has received an alloted number of objects.

12. An arrangement as defined in claim 11, in which said releasing mechanism is actuated by the objects entering said depositing member.

13. In combination, in a device of the class described, comprising a depositing member, a receiving member and a means for locking the depositing member of said device in receiving position when the receiving member is not in place, comprising: an engageable formation; an engager member arranged to engage said formation; and means for disengaging said member and said formation when said receiving member is in place.

In testimony whereof, I have hereunto set my hand at Los Angeles, California, this 21st day of March, 1923.

GEORGE WILCOX.